US012715993B2

(12) United States Patent
Tan et al.

(10) Patent No.: US 12,715,993 B2
(45) Date of Patent: Aug. 25, 2026

(54) POLYMER COMPOSITIONS FOR AN ELECTRIC VEHICLE

(71) Applicant: Ticona LLC, Florence, KY (US)

(72) Inventors: Zhe Tan, Shanghai (CN); Yuehua Yu, Cincinnati, OH (US); Fangfang Tao, Shanghai (CN)

(73) Assignee: Ticona LLC, Florence, KY (US)

( * ) Notice: Subject to any disclaimer, the term of this patent is extended or adjusted under 35 U.S.C. 154(b) by 666 days.

(21) Appl. No.: 18/160,325

(22) Filed: Jan. 27, 2023

(65) Prior Publication Data

US 2023/0242763 A1 Aug. 3, 2023

Related U.S. Application Data

(60) Provisional application No. 63/309,695, filed on Feb. 14, 2022, provisional application No. 63/361,948, filed on Feb. 1, 2022.

(51) Int. Cl.

*C08L 81/02* (2006.01)
*C08K 7/14* (2006.01)
*C08L 23/04* (2006.01)
*C08L 83/06* (2006.01)

(52) U.S. Cl.

CPC ................ *C08L 81/02* (2013.01); *C08K 7/14* (2013.01); *C08L 23/04* (2013.01); *C08L 83/06* (2013.01); *C08L 2203/20* (2013.01)

(58) Field of Classification Search

CPC ......... C08G 75/14; C08L 81/02; C08L 23/04; C08L 83/06; C08L 2203/20; C08K 7/14

See application file for complete search history.

(56) References Cited

U.S. PATENT DOCUMENTS

| | | | |
|---|---|---|---|
| 4,418,029 | A | 11/1983 | Reed et al. |
| 4,581,411 | A | 4/1986 | Liang et al. |
| 4,708,983 | A | 11/1987 | Liang |
| 4,871,810 | A | 10/1989 | Saltman |
| 4,888,390 | A | 12/1989 | Liang et al. |
| 5,011,887 | A | 4/1991 | Sasaki et al. |
| 5,028,461 | A | 7/1991 | Nakamichi |
| 5,071,907 | A | 12/1991 | Nakata et al. |
| 5,081,322 | A | 1/1992 | Winter |
| 5,157,070 | A | 10/1992 | Orikasa et al. |
| 5,187,257 | A | 2/1993 | Katto et al. |
| 5,191,020 | A | 3/1993 | Masamoto et al. |
| 5,219,920 | A | 6/1993 | Yamamoto et al. |
| 5,258,450 | A | 11/1993 | Nakata et al. |

(Continued)

FOREIGN PATENT DOCUMENTS

| | | |
|---|---|---|
| CA | 1278630 C | 1/1991 |
| CN | 1718635 A | 1/2006 |

(Continued)

OTHER PUBLICATIONS

Lotader AX8840 catalog, May 2024.*

(Continued)

*Primary Examiner* — Shane Fang
(74) *Attorney, Agent, or Firm* — Dority & Manning, P.A.

(57) ABSTRACT

A polymer composition that includes a polyarylene sulfide is disclosed. The polymer composition can be utilized in forming components of an electric vehicle, such as electrical components and/or thermal management system components.

21 Claims, 7 Drawing Sheets

(56) References Cited

U.S. PATENT DOCUMENTS

| | | | |
|---|---|---|---|
| 5,270,375 | A | 12/1993 | Yamamoto et al. |
| 5,281,665 | A | 1/1994 | Fukui et al. |
| 5,288,798 | A | 2/1994 | Koshirai et al. |
| 5,288,817 | A | 2/1994 | Yamamoto et al. |
| 5,324,796 | A | 6/1994 | Han |
| 5,604,287 | A | 2/1997 | Yamao |
| 5,681,893 | A | 10/1997 | Bailly et al. |
| 5,723,542 | A | 3/1998 | Hwang et al. |
| 6,072,012 | A | 6/2000 | Juen et al. |
| 6,166,137 | A | 12/2000 | Brown et al. |
| 6,608,136 | B1 | 8/2003 | Dean et al. |
| 6,699,946 | B1 | 3/2004 | Lambla et al. |
| 6,730,378 | B2 | 5/2004 | Matsuoka et al. |
| 6,849,697 | B2 | 2/2005 | Lambla et al. |
| 6,960,628 | B2 | 11/2005 | Matsuoka et al. |
| 7,173,090 | B2 | 2/2007 | Akiyama et al. |
| 7,750,111 | B2 | 7/2010 | Horiuchi et al. |
| 7,863,378 | B2 | 1/2011 | Nishihara et al. |
| 7,960,473 | B2 | 6/2011 | Kobayashi et al. |
| 8,058,330 | B2 | 11/2011 | Irie et al. |
| 8,324,308 | B2 | 12/2012 | Kinouchi |
| 8,603,599 | B2 | 12/2013 | Matsuo et al. |
| 8,618,218 | B2 | 12/2013 | Ramalingam et al. |
| 8,663,764 | B2 | 3/2014 | Luo et al. |
| 8,664,322 | B2 | 3/2014 | Lee et al. |
| 8,703,029 | B2 | 4/2014 | Takada et al. |
| 8,779,051 | B2 | 7/2014 | Kisin et al. |
| 8,796,392 | B2 | 8/2014 | Luo et al. |
| 8,852,707 | B2 | 10/2014 | Nishikawa et al. |
| 8,859,693 | B2 | 10/2014 | Hasegawa et al. |
| 8,975,305 | B2 | 3/2015 | Topolkaraev et al. |
| 9,074,096 | B2 | 7/2015 | Okubo et al. |
| 9,187,641 | B2 | 11/2015 | Ouchiyama et al. |
| 9,416,272 | B2 | 8/2016 | Ouchiyama et al. |
| 9,493,646 | B2 | 11/2016 | Luo et al. |
| 9,494,260 | B2 | 11/2016 | Luo et al. |
| 9,494,262 | B2 | 11/2016 | Luo et al. |
| 9,611,388 | B2 | 4/2017 | Watanabe et al. |
| 9,650,515 | B2 | 5/2017 | Kang et al. |
| 9,708,483 | B2 | 7/2017 | Niessner et al. |
| 9,718,225 | B2 | 8/2017 | Luo et al. |
| 9,758,674 | B2 | 9/2017 | Luo et al. |
| 9,771,465 | B2 | 9/2017 | Ichinose et al. |
| 9,938,407 | B2 | 4/2018 | Unohara et al. |
| 10,017,643 | B2 | 7/2018 | Arai |
| 10,358,556 | B2 | 7/2019 | Luo et al. |
| 10,359,129 | B2 | 7/2019 | Luo et al. |
| 10,450,461 | B2 | 10/2019 | Tu et al. |
| 10,457,808 | B2 | 10/2019 | Gallucci et al. |
| 10,501,626 | B2 | 12/2019 | Luo et al. |
| 10,563,062 | B2 | 2/2020 | Luo et al. |
| 10,590,273 | B2 | 3/2020 | Luo et al. |
| 10,862,078 | B2 | 12/2020 | Kim |
| 11,091,635 | B1 | 8/2021 | Ohnishi et al. |
| 11,180,637 | B2 | 11/2021 | Anim-Danso et al. |
| 2005/0054843 | A1 | 3/2005 | Estell et al. |
| 2013/0012638 | A1 | 1/2013 | Ritter et al. |
| 2013/0035440 | A1 | 2/2013 | Nishikawa et al. |
| 2013/0269977 | A1 | 10/2013 | Luo et al. |
| 2013/0273281 | A1 | 10/2013 | Luo et al. |
| 2014/0177155 | A1 | 6/2014 | Luo et al. |
| 2014/0316041 | A1 | 10/2014 | Mehta |
| 2015/0064437 | A1* | 3/2015 | Luo ..................... B29C 45/0005 264/319 |
| 2015/0072093 | A1* | 3/2015 | Zhang ....................... B29B 7/72 264/293 |
| 2015/0197605 | A1 | 7/2015 | Lee et al. |
| 2015/0225547 | A1 | 8/2015 | Tu et al. |
| 2015/0225567 | A1 | 8/2015 | Miller et al. |
| 2017/0096557 | A1 | 4/2017 | Ohnishi et al. |
| 2017/0166748 | A1* | 6/2017 | Luo ......................... B32B 27/38 |
| 2017/0313880 | A1 | 11/2017 | Yamada et al. |
| 2018/0015648 | A1* | 1/2018 | Luo .................... B65D 63/1027 |
| 2018/0265701 | A1 | 9/2018 | Tomoda et al. |
| 2020/0216667 | A1 | 7/2020 | Luo et al. |
| 2021/0108078 | A1 | 4/2021 | Wakao et al. |
| 2022/0002544 | A1 | 1/2022 | Lee et al. |
| 2022/0243045 | A1 | 8/2022 | Moroka et al. |
| 2022/0267542 | A1 | 8/2022 | Miyabara et al. |
| 2023/0279228 | A1 | 9/2023 | Kurata et al. |
| 2023/0287214 | A1 | 9/2023 | Kurata et al. |
| 2023/0303839 | A1 | 9/2023 | Tan et al. |
| 2023/0407090 | A1 | 12/2023 | Yumiyama et al. |
| 2024/0150577 | A1 | 5/2024 | Kurata et al. |
| 2024/0166876 | A1 | 5/2024 | He et al. |
| 2024/0254335 | A1 | 8/2024 | Yamamoto et al. |

FOREIGN PATENT DOCUMENTS

| | | | |
|---|---|---|---|
| CN | 1314762 | C | 5/2007 |
| CN | 101864169 | B | 9/2012 |
| CN | 102311644 | B | 6/2013 |
| CN | 103554914 | A | 2/2014 |
| CN | 103965642 | A | 8/2014 |
| CN | 104672903 | A | 6/2015 |
| CN | 102807753 | B | 9/2015 |
| CN | 104910623 | B | 10/2017 |
| CN | 105493310 | B | 11/2018 |
| CN | 109423048 | A | 3/2019 |
| CN | 110643179 | A | 1/2020 |
| CN | 110964322 | A | 4/2020 |
| CN | 1127246575 | A | 4/2021 |
| CN | 112759932 | A | 5/2021 |
| CN | 112778762 | A | 5/2021 |
| CN | 114525032 | A | 5/2022 |
| CN | 115216152 | A | 10/2022 |
| CN | 112795190 | B | 12/2022 |
| CN | 115678278 | A | 2/2023 |
| CN | 115746563 | A | 3/2023 |
| CN | 112194895 | B | 4/2023 |
| CN | 112552684 | B | 4/2023 |
| CN | 115894916 | A | 4/2023 |
| CN | 114907691 | B | 5/2023 |
| CN | 116082840 | A | 5/2023 |
| CN | 116120747 | A | 5/2023 |
| CN | 116218218 | A | 6/2023 |
| CN | 116285351 | A | 6/2023 |
| CN | 114085527 | B | 7/2023 |
| CN | 114085526 | B | 8/2023 |
| CN | 114456598 | B | 9/2023 |
| DE | 4016059 | A1 | 11/1991 |
| EP | 0 288 308 | B1 | 4/1988 |
| EP | 0 389 905 | A1 | 10/1990 |
| EP | 0 473 962 | | 8/1991 |
| EP | 0 480 426 | | 10/1991 |
| EP | 0 732 366 | A2 | 9/1996 |
| EP | 3 252 106 | A1 | 12/2017 |
| EP | 3 239 240 | B1 | 4/2020 |
| EP | 4 169 983 | | 4/2020 |
| EP | 3 489 304 | | 5/2022 |
| EP | 4 122 976 | A1 | 1/2023 |
| EP | 2 128 200 | B2 | 12/2024 |
| JP | S 6227459 | | 2/1987 |
| JP | S 62268612 | | 11/1987 |
| JP | S 63189457 | | 8/1988 |
| JP | H 01240566 | | 9/1989 |
| JP | H 02225565 | | 9/1990 |
| JP | H 02286746 | | 11/1990 |
| JP | H 03140368 | | 6/1991 |
| JP | H 0472356 | | 3/1992 |
| JP | H 059385 | | 1/1993 |
| JP | H 06239972 | | 8/1994 |
| JP | H 06306285 | A | 11/1994 |
| JP | H 0753869 | | 2/1995 |
| JP | H 08337719 | | 12/1996 |
| JP | H 11130961 | | 5/1999 |
| JP | H 11349813 | | 12/1999 |
| JP | 2000001615 | A | 1/2000 |
| JP | 2000103963 | A | 4/2000 |
| JP | 2000186209 | A | 7/2000 |
| JP | 2004217895 | A | 8/2004 |
| JP | 2005306926 | A | 11/2005 |
| JP | 2006045390 | A | 2/2006 |
| JP | 2006328291 | A | 12/2006 |

(56) References Cited

FOREIGN PATENT DOCUMENTS

| | | | |
|---|---|---|---|
| JP | 2008144002 | A | 6/2008 |
| JP | 2008260830 | A | 10/2008 |
| JP | 2011016942 | A | 1/2011 |
| JP | 2011026439 | A | 2/2011 |
| JP | 4725050 | B2 | 7/2011 |
| JP | 4873149 | B2 | 2/2012 |
| JP | 4912620 | B2 | 4/2012 |
| JP | 4961921 | B2 | 6/2012 |
| JP | 5003640 | B2 | 8/2012 |
| JP | 5023682 | B2 | 9/2012 |
| JP | 5029311 | B2 | 9/2012 |
| JP | 5040630 | B2 | 10/2012 |
| JP | 5339912 | B2 | 11/2013 |
| JP | 2014114389 | A | 6/2014 |
| JP | 2014177571 | A | 9/2014 |
| JP | 2014189573 | A | 10/2014 |
| JP | 2015065127 | A | 4/2015 |
| JP | 5742377 | B2 | 7/2015 |
| JP | 2015147891 | A | 8/2015 |
| JP | 5919004 | B2 | 5/2016 |
| JP | 2016166268 | A | 9/2016 |
| JP | 2016196538 | A | 11/2016 |
| JP | 6040742 | B2 | 12/2016 |
| JP | 6070018 | B2 | 2/2017 |
| JP | 2017066344 | A | 4/2017 |
| JP | 2017066374 | A | 4/2017 |
| JP | 2017132869 | A | 8/2017 |
| JP | 2018053003 | A | 4/2018 |
| JP | 2018053118 | A | 4/2018 |
| JP | 2018145367 | A | 9/2018 |
| JP | 2018162388 | A | 10/2018 |
| JP | 6497110 | B2 | 4/2019 |
| JP | 2019065071 | A | 4/2019 |
| JP | 6511785 | B2 | 5/2019 |
| JP | 6536684 | B2 | 7/2019 |
| JP | 2019131685 | A | 8/2019 |
| JP | 6668688 | B2 | 3/2020 |
| JP | 6753470 | B2 | 9/2020 |
| JP | 6797350 | B2 | 12/2020 |
| JP | 6809083 | B2 | 1/2021 |
| JP | 6919178 | B2 | 8/2021 |
| JP | 6926729 | B2 | 8/2021 |
| JP | 2021134267 | A | 9/2021 |
| JP | 2021143223 | A | 9/2021 |
| JP | 6943730 | B2 | 10/2021 |
| JP | 2022003107 | A | 1/2022 |
| JP | 2022109212 | A | 7/2022 |
| JP | 7139571 | B2 | 9/2022 |
| JP | 7151086 | B2 | 10/2022 |
| JP | 2022146322 | A | 10/2022 |
| JP | 2023019030 | A | 2/2023 |
| JP | 2023026340 | A | 2/2023 |
| JP | 2023068631 | A | 5/2023 |
| JP | 2023091755 | A | 6/2023 |
| KR | 20140092472 | A | 7/2014 |
| KR | 101651754 | B1 | 9/2016 |
| KR | 20220033866 | A | 3/2022 |
| KR | 20220092704 | A | 7/2022 |
| KR | 20230107980 | A | 7/2023 |
| KR | 102571437 | | 8/2023 |
| WO | WO 94/16018 | A1 | 7/1994 |
| WO | WO 2015/031232 | A1 | 3/2015 |
| WO | WO 2015/031233 | A1 | 3/2015 |
| WO | WO 2015/064499 | A1 | 5/2015 |
| WO | WO 2015/134860 | | 9/2015 |
| WO | WO 2017/010364 | | 1/2017 |
| WO | WO 2017/057558 | | 4/2017 |
| WO | WO 2017/057559 | | 4/2017 |
| WO | WO 2019/158406 | A1 | 8/2019 |
| WO | WO 2022/169576 | | 8/2022 |

OTHER PUBLICATIONS

Paper—Ryan et al., "Ultra High Molecular Weight Functional Siloxane Additives in Polymers: Effects on Processing and Properties," *Dow Corning,* 2001, 16 pages.

Product Information on Dow Corning® MB50-314, Masterbatch, from Dow Corning, 2001, 2 pages.

Tang et al., Lightweight Material Technology, *National Defense Industry Press,* pp. 428 to 432.

International Search Report and Written Opinion for PCT/US2023/011714 dated Jul. 25, 2023, 11 pages.

Supplementary European Search Report for EP 23 75 0076 dated Dec. 18, 2025, 10 pages.

* cited by examiner

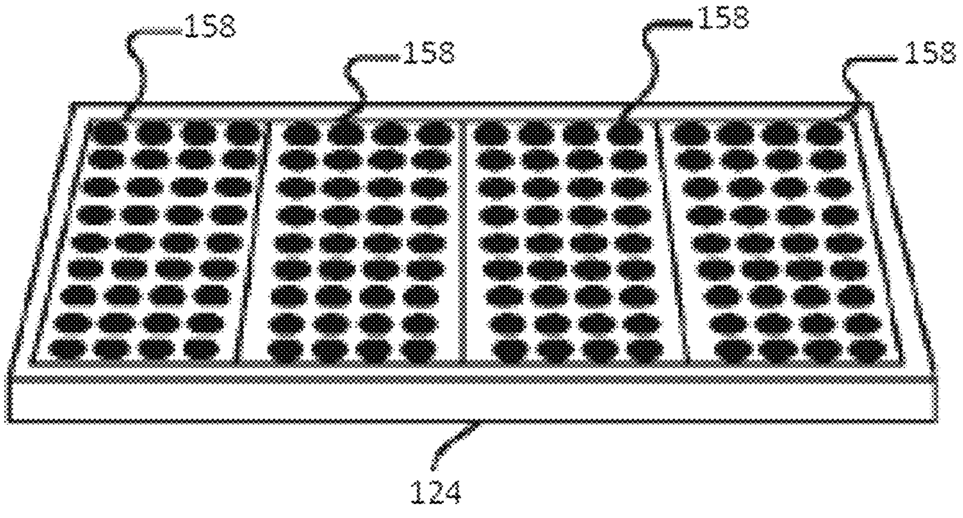
FIG. 3
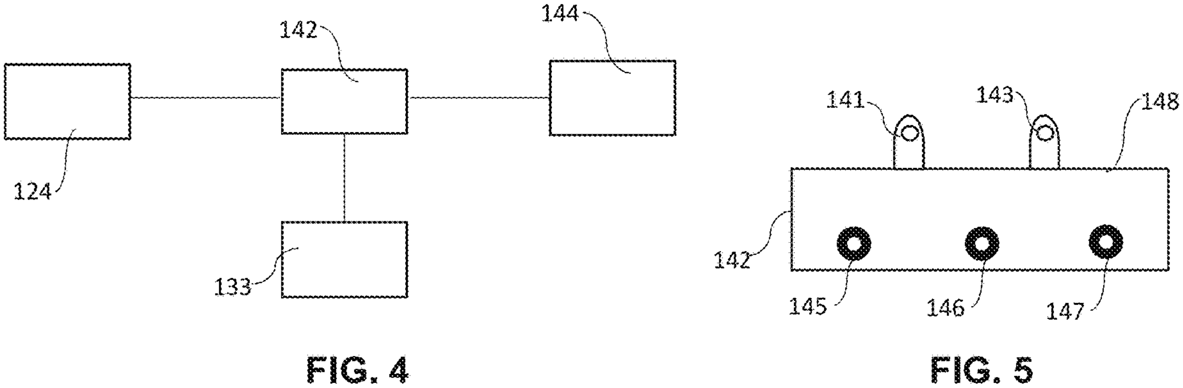
FIG. 4
FIG. 5

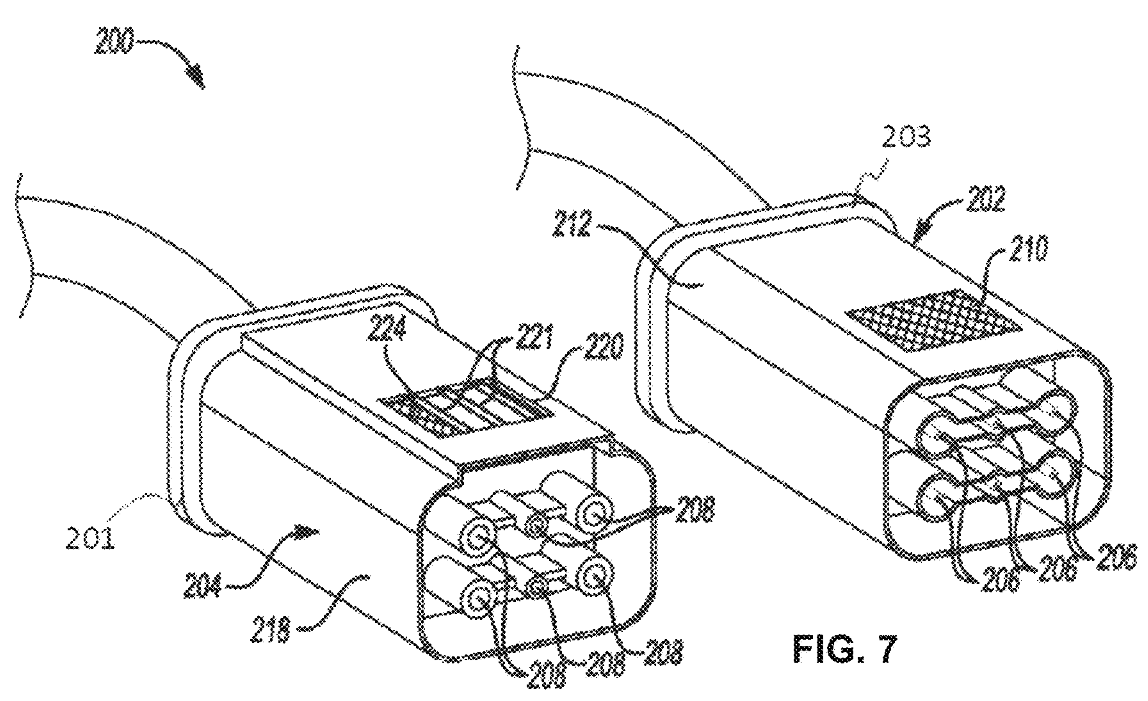
FIG. 7
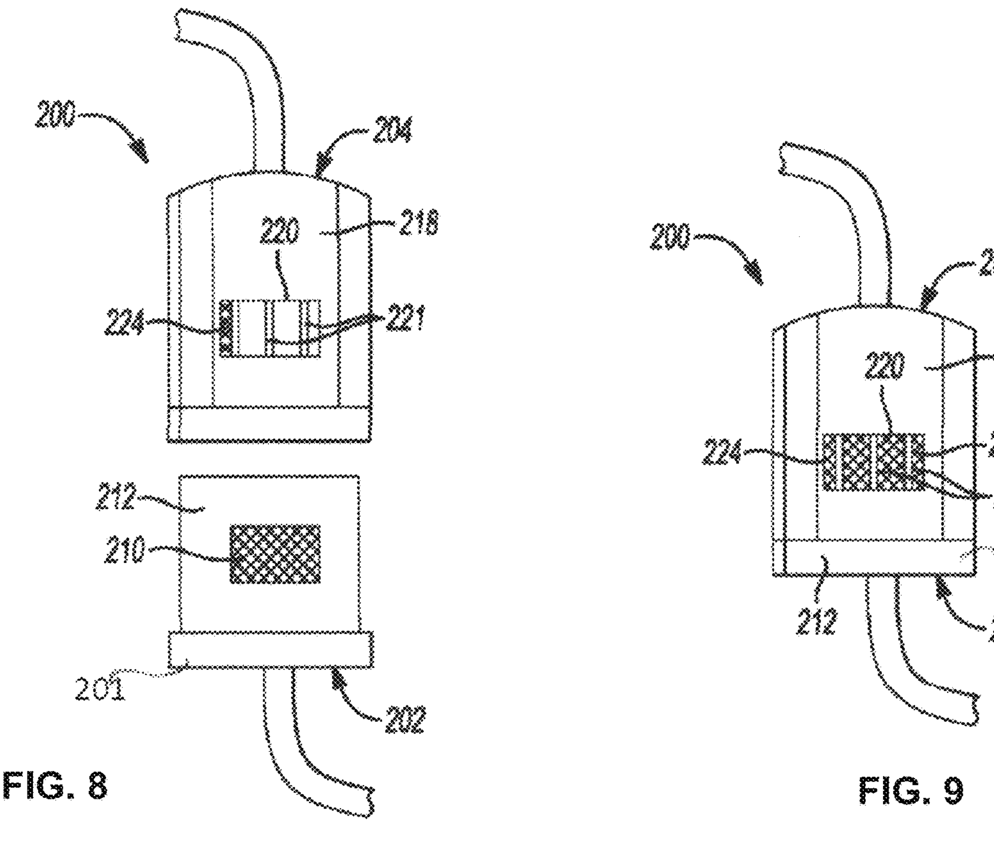
FIG. 8
FIG. 9

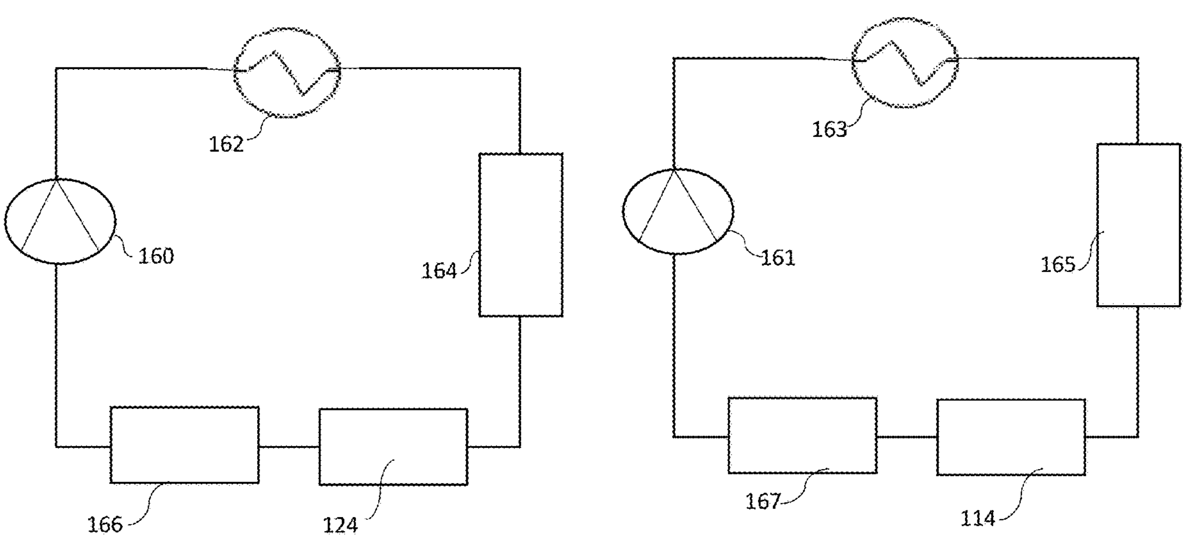
FIG. 12
FIG. 13
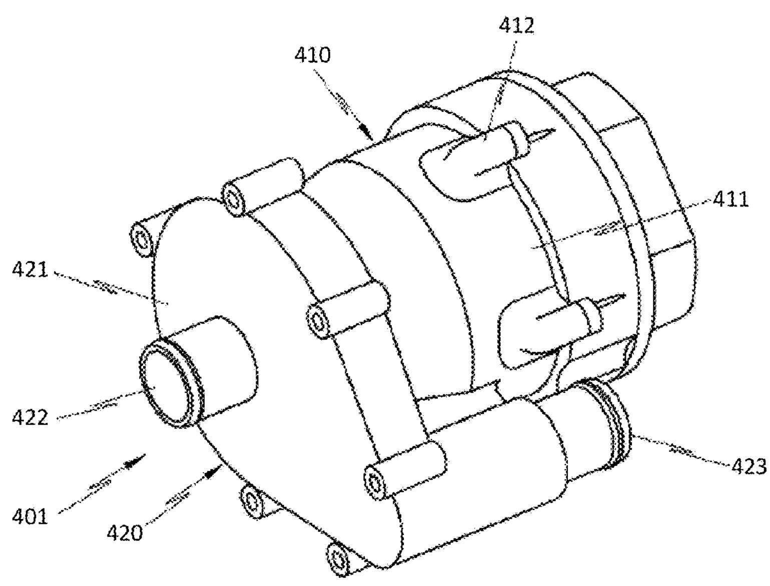
FIG. 14

POLYMER COMPOSITIONS FOR AN ELECTRIC VEHICLE

RELATED APPLICATIONS

The present application is based upon and claims priority to U.S. Provisional Patent Application Ser. No. 63/361,948 having a filing date of Feb. 1, 2022; and U.S. Provisional Patent Application Ser. No. 63/309,695, having a filing date of Feb. 14, 2022, which are incorporated herein by reference.

BACKGROUND OF THE INVENTION

Electric vehicles, such as battery-electric vehicles, plug-in hybrid-electric vehicles, mild hybrid-electric vehicles, or full hybrid-electric vehicles generally have an electric powertrain that contains an electric propulsion source (e.g., battery) and a transmission. Plastic materials are often employed in the electric vehicle for various components, such as in high voltage connectors, power converter housings, battery assembly housings, fluid pumps, inverters, busbars, twisted cables, individual sense lead wires, wire crimps, grommet moldings, quick connectors, tees, interconnects, guide rails, sealing rings (e.g., brushless direct current sealing rings, battery cell sealing rings, etc.), etc. Unfortunately, plastic materials often used in such components exhibit poor mechanical characteristics (e.g., tensile strengths and impact resistances) for successful long-term use in harsh environments as will be encountered in electric vehicles. Moreover, many plastic materials exhibit processing characteristics (e.g., melt viscosity, molding characteristics) causing difficulties in formation of final products such as electric vehicle components, with high product loss, particularly for molded pieces with exacting tolerance requirements. As such, a need currently exists for polymer compositions that exhibit desirable mechanical and processing characteristics for favorable use in a variety of applications, and in particular in electric vehicle components.

SUMMARY OF THE INVENTION

In accordance with one embodiment of the present invention, a polymer composition is disclosed that comprises 100 parts by weight of at least one polyarylene sulfide, from about 10 to about 80 parts by weight of a fibrous filler, from about 1 to about 20 parts by weight of at least one impact modifier, and from about 0.1 to about 10 parts by weight of an ultrahigh molecular weight siloxane polymer having a weight average molecular weight of about 100,000 grams per mole or more.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which:

FIG. 3 illustrates a battery assembly that may employ components that may incorporate a polymer composition as disclosed herein;

FIG. 4 illustrates an electronic system as may include components that may incorporate a polymer composition as disclosed herein;

FIG. 5 illustrates a current sensor as may be included in an electronic system as in FIG. 4;

FIG. 7 is a perspective view of one embodiment of a connector that may incorporate a polymer composition as disclosed herein;

FIG. 8 is a plan view of the connector of FIG. 7 in which the first and second connector portions are disengaged;

FIG. 9 is a plan view of the connector of FIG. 7 in which the first and second connector portions are engaged;

FIG. 12 illustrates a low temperature thermal loop as may include components that may incorporate a polymer composition as disclosed herein;

FIG. 13 illustrates a high temperature thermal loop as may include components that may incorporate a polymer composition as disclosed herein; and FIG. 14 illustrates one embodiment of a water pump as may incorporate a polymer composition as disclosed herein.

Figure 1:
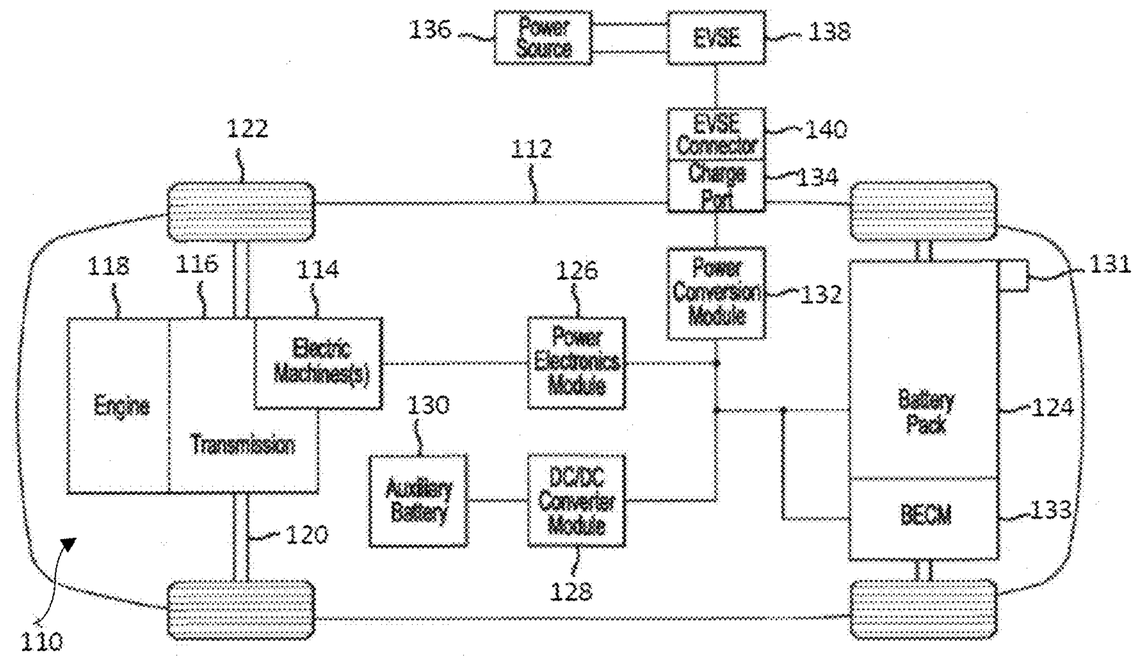
FIG. 1 illustrates an electric vehicle including components that may incorporate a polymer composition as disclosed herein.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to polymer compositions that exhibit desirable processing and mechanical properties for use in components of an electric vehicle, such as a battery-powered electric vehicle, fuel cell-powered electric vehicle, plug-in hybrid-electric vehicle (PHEV), mild hybrid-electric vehicle (MHEV), full hybrid-electric vehicle (FHEV), etc.

The polymer composition may, for example, exhibit a relatively low melt viscosity, such as about 30 kP or less, in some embodiments about 20 kP or less, in some embodiments about 10 kP or less, in some embodiments about 5 kP or less, and in some embodiments, from about 2 to about 50 kP, as determined in accordance with ISO 11443:2021 at a temperature of about 310° C. and at a shear rate of 400 $s^{-1}$. Despite having a low melt viscosity, the polymer composition may nevertheless maintain a high degree of impact strength as well as tensile strength, which can provide enhanced flexibility for the resulting component. For example, the polymer composition may exhibit a notched Izod impact strength of about 5 $kJ/m^2$ or more, such as in some embodiments from about 6 to about 50 $kJ/m^2$, and in some embodiments, from about 7 to about 30 $kJ/m^2$, as determined at a temperature of 23° C. in accordance with ISO 180:2019, as well as a Charpy notched impact strength of about 6 $kJ/m^2$ or more, such as in some embodiments from about 8 to about 50 $kJ/m^2$, and in some embodiments, from about 10 to about 30 $kJ/m^2$, as determined at a temperature of 23° C. in accordance with ISO 179-1:2010. For example, the composition may exhibit a tensile stress at break of about 100 MPa or more, in some embodiments from about 100 MPa to about 200 MPa, in some embodiments from about 110 to about 180 MPa, and in some embodiments, from about 120 to about 170 MPa; a tensile break strain of about 1% or more, in some embodiments from about 1% to about 10%; and/or a tensile modulus of about 15,000 MPa or less, in some embodiments from about 1,000 MPa to about 12,000 MPa, in some embodiments from about 5,000 MPa to about 11,000 MPa. The tensile properties may be determined in accordance with ISO Test No. 527:2019 at a temperature of 23° C.

Notably, however, the present inventors have also discovered that the polymer composition is not highly sensitive to aging at high temperatures. For example, a part formed from the composition may be aged in an atmosphere having a temperature of from about 100° C. or more, in some embodiments from about 150° C. to about 200° C., and in some embodiments, from about 200° C. to about 260° C. (e.g., 240° C.) for a time period of about 100 hours or more, in some embodiments from about 300 hours to about 3000 hours, and in some embodiments, from about 400 hours to about 2500 hours (e.g., about 1,000 hours). Even after aging, the mechanical properties (e.g., impact strength, tensile properties, and/or flexural properties) may remain within the ranges noted above. For example, the ratio of a particular mechanical property (e.g., Charpy unnotched impact strength, tensile modulus, tensile strength, tensile break strain, etc.) after "aging" at 240° C. for 1,000 hours to the initial mechanical property prior to such aging may be about 0.4 or more, in some embodiments about 0.5 or more, and in some embodiments, from about 0.6 to 1.0. In one embodiment, for example, a part may exhibit a Charpy notched impact strength after being aged at a high temperature (e.g., 240° C.) for 1,000 hours of greater than about 5 kJ/m$^2$, in some embodiments from about 6 to about 30 kJ/m$^2$, and in some embodiments, from about 7 to about 20 kJ/m$^2$, measured according to ISO 179-1:2010 at a temperature of 23° C. After being aged at a high temperature atmosphere (e.g., 240° C.) for 1,000 hours, the part may also exhibit a tensile strength of from about 50 to about 300 MPa, in some embodiments from about 80 to about 200 MPa, and in some embodiments, from about 100 to about 150 MPa; a tensile modulus of from about 5,000 to about 25,000 MPa, in some embodiments from about 8,000 to about 22,000 MPa, and in some embodiments, from about 10,000 to about 20,000 MPa; and/or a tensile break strain of from about 0.4% to about 8%, in some embodiments from about 0.6% to about 5%, and in some embodiments, from about 0.8% to about 3%, as determined at a temperature of 23° C. in accordance with ISO 527-2/1A:2019.

The polymer composition can also exhibit good heat resistance and flame retardant characteristics. For instance, a polymer composition can meet the V-0 flammability standard at a thickness of 0.2 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

TABLE 1

| Rating | Afterflame Time (s) | Burning Drips | Burn to Clamp |
|---|---|---|---|
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, the polymer composition may achieve at least a V-1 rating, and typically a V-0 rating, for specimens having a thickness of 0.8 millimeters.

Various embodiments of the present invention will now be described in greater detail below.

I. Polymer Composition

A. Polyarylene Sulfide

Polyarylene sulfides typically constitute from about 50 wt. % to about 98 wt. %, in some embodiments from about 55 wt. % to about 95 wt. %, and in some embodiments, from about 60 wt. % to about 90 wt. % of the polymer composition. The polyarylene sulfide(s) employed in the composition generally have repeating units of the formula:

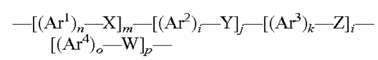

$$—[(Ar^1)_n—X]_m—[(Ar^2)_i—Y]_j—[(Ar^3)_k—Z]_l—[(Ar^4)_o—W]_p—$$

wherein, $Ar^1$, $Ar^2$, $Ar^3$, and $Ar^4$ are independently arylene units of 6 to 18 carbon atoms;

W, X, Y, and Z are independently bivalent linking groups selected from —$SO_2$—, –S—, —SO—, —CO—, –O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthalene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —$(C_6H_4—S)_n$— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

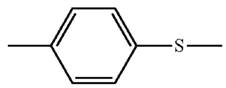

and segments having the structure of formula:

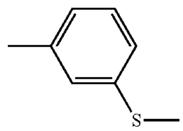

or segments having the structure of formula:

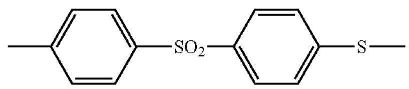

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

If desired, the polyarylene sulfide can be functionalized. For instance, a disulfide compound containing reactive functional groups (e.g., carboxyl, hydroxyl, amine, etc.) can be reacted with the polyarylene sulfide. Functionalization of the polyarylene sulfide can further provide sites for bonding between any optional impact modifiers and the polyarylene sulfide, which can improve distribution of the impact modifier throughout the polyarylene sulfide and prevent phase separation. The disulfide compound may undergo a chain scission reaction with the polyarylene sulfide during melt processing to lower its overall melt viscosity. When employed, disulfide compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The ratio of the amount of the polyarylene sulfide to the amount of the disulfide compound may likewise be from about 1000:1 to about 10:1, from about 500:1 to about 20:1, or from about 400:1 to about 30:1. Suitable disulfide compounds are typically those having the following formula:

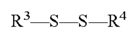

$R^3$—S—S—$R^4$ wherein $R^3$ and $R^4$ may be the same or different and are hydrocarbon groups that independently include from 1 to about 20 carbons. For instance, $R^3$ and $R^4$ may be an alkyl, cycloalkyl, aryl, or heterocyclic group. In certain embodiments, $R^3$ and $R^4$ are generally nonreactive functionalities, such as phenyl, naphthyl, ethyl, methyl, propyl, etc. Examples of such compounds include diphenyl disulfide, naphthyl disulfide, dimethyl disulfide, diethyl disulfide, and dipropyl disulfide. $R^3$ and $R^4$ may also include reactive functionality at terminal end(s) of the disulfide compound.

For example, at least one of $R^3$ and $R^4$ may include a terminal carboxyl group, hydroxyl group, a substituted or non-substituted amino group, a nitro group, or the like. Examples of compounds may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid (or 2,2'-dithiobenzoic acid), dithioglycolic acid, α,α'-dithiodilactic acid, β,β'-dithiodilactic acid, 3,3'-dithiodipyridine, 4,4'dithiomorpholine, 2,2'-dithiobis (benzothiazole), 2,2'-dithiobis(benzimidazole), 2,2'-dithiobis(benzoxazole), 2-(4'-morpholinodithio)benzothiazole, etc., as well as mixtures thereof.

The melt flow rate of a polyarylene sulfide incorporated in a composition can be from about 100 to about 800 grams per 10 minutes ("g/10 min"), in some embodiments from about 200 to about 700 g/10 min, and in some embodiments, from about 300 to about 600 g/10 min, as determined in accordance with ISO 1133 at a load of 5 kg and temperature of 316° C.

B. Impact Modifier

As indicated above, an impact modifier is also employed within the polymer composition. Typically, the impact modifier(s) constitute from about 1 to about 20 parts, in some embodiments from about 2 to about 15 parts, and in some embodiments, from about 5 to about 10 parts by weight per 100 parts by weight of the polyarylene sulfide(s). For example, the impact modifiers may constitute from about 0.1 wt. % to about 20 wt. %, in some embodiments from about 0.5 wt. % to about 15 wt. %, and in some embodiments, from about 1 wt. % to about 10 wt. % of the polymer composition.

Examples of suitable impact modifiers may include, for instance, polyepoxides, polyurethanes, polybutadiene, acrylonitrile-butadiene-styrene, polyamides, block copolymers (e.g., polyether-polyamide block copolymers), etc., as well as mixtures thereof. In one embodiment, an olefin copolymer is employed that is "epoxy-functionalized" in that it contains, on average, two or more epoxy functional groups per molecule. The copolymer generally contains an olefinic monomeric unit that is derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The copolymer may also contain an epoxy-functional monomeric unit. One example of such a unit is an epoxy-functional (meth)acrylic monomeric component. As used herein, the term "(meth) acrylic" includes acrylic and methacrylic monomers, as well as salts or esters thereof, such as acrylate and methacrylate monomers. For example, suitable epoxy-functional (meth) acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Other suitable monomers may also be employed to help achieve the desired molecular weight.

Of course, the copolymer may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate), which has the following structure:

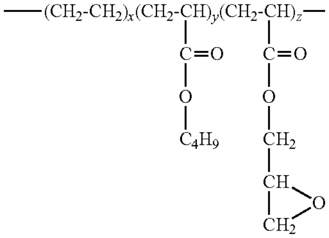

wherein, x, y, and z are 1 or greater.

The relative portion of the monomeric component(s) may be selected to achieve a balance between epoxy-reactivity and melt flow rate. More particularly, high epoxy monomer contents can result in good reactivity with the polyarylene sulfide, but too high of a content may reduce the melt flow rate to such an extent that the copolymer adversely impacts the melt strength of the polymer blend. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. The resulting melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

If desired, additional impact modifiers may also be employed in combination with the epoxy-functional impact modifier. For example, the additional impact modifier may include a block copolymer in which at least one phase is made of a material that is hard at room temperature but fluid upon heating and another phase is a softer material that is rubber-like at room temperature. For instance, the block copolymer may have an A-B or A-B-A block copolymer repeating structure, where A represents hard segments and B is a soft segment. Non-limiting examples of impact modifiers having an A-B repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Triblock copolymers may likewise contain polystyrene as the hard segment and either polybutadiene, polyisoprene, or polyethylene-co-butylene as the soft segment. Similarly, styrene butadiene repeating co-polymers may be employed, as well as polystyrene/polyisoprene repeating polymers. In one particular embodiment, the block copolymer may have alternating blocks of polyamide and polyether. Such materials are commercially available, for example from Atofina under the PEBAX™ trade name. The polyamide blocks may be derived from a copolymer of a diacid component and a diamine component or may be prepared by homopolymerization of a cyclic lactam. The polyether block may be derived from homo- or copolymers of cyclic ethers such as ethylene oxide, propylene oxide, and tetrahydrofuran.

C. Siloxane Polymer

A siloxane polymer is also be employed in the polymer composition. Such siloxane polymer(s) typically constitute from about 0.05 to about 10 parts, in some embodiments from about 0.1 to about 8 parts, and in some embodiments, from about 0.5 to about 5 parts by weight per 100 parts by weight of the polyarylene sulfide(s). For example, siloxane polymer(s) may constitute from about 0.05 wt. % to about 15 wt. %, in some embodiments from about 0.5 wt. % to about 10 wt. %, and in some embodiments, from about 1 wt. % to about 8 wt. % of the polymer composition.

Without intending to be limited by theory, it is believed that the siloxane polymer can, among other things, improve the processing of the composition, such as by providing better mold filling, internal lubrication, mold release, etc. Further, it is also believed that the siloxane polymer is less likely to migrate or diffuse to the surface of the composition, which further minimizes the likelihood of phase separation and further assists in dampening impact energy. The siloxane polymer generally has a high molecular weight, such as a weight average molecular weight of about 100,000 grams per mole or more, in some embodiments about 200,000 grams per mole or more, and in some embodiments, from about 500,000 grams per mole to about 2,000,000 grams per mole. The siloxane polymer may also have a relatively high kinematic viscosity at 25° C., such as about 10,000 centistokes or more, in some embodiments about 30,000 centistokes or more, and in some embodiments, from about 50,000 to about $50\times10^6$ centistokes, such as from about $1\times10^6$ to $50\times10^6$ centistokes. The viscosity of a siloxane polymer can be determined according to ASTM D445-21.

Any of a variety of high molecular weight siloxane polymers may generally be employed in the polymer composition. A high molecular weight siloxane polymer generally includes siloxane-based monomer residue repeating units. As used herein, "siloxane" denotes a monomer residue repeat unit having the structure:

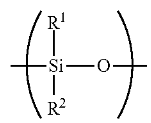

where $R^1$ and $R^2$ are independently hydrogen or a hydrocarbyl moiety, which is known as an "M" group in silicone chemistry.

The silicone may include branch points such as

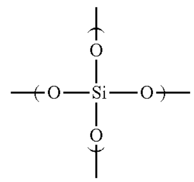

which is known as a "Q" group in silicone chemistry, or

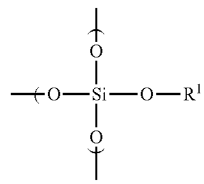

which is known as "T" group in silicone chemistry.

As used herein, the term "hydrocarbyl" denotes a univalent group formed by removing a hydrogen atom from a hydrocarbon (e.g., alkyl groups, such as ethyl, or aryl groups, such as phenyl). In one or more embodiments, a siloxane monomer residue can be any dialkyl, diaryl, dialkaryl, or diaralkyl siloxane, having the same or differing alkyl, aryl, alkaryl, or aralkyl moieties. In an embodiment, each of $R^1$ and $R^2$ is independently a $C_1$ to $C_{20}$, $C_1$ to $C_{12}$, or $C_1$ to $C_6$ alkyl (e.g., methyl, ethyl, propyl, butyl, etc.), aryl (e.g., phenyl), alkaryl, aralkyl, cycloalkyl (e.g., cyclopentyl), arylenyl, alkenyl, cycloalkenyl (e.g., cyclohexenyl), alkoxy (e.g., methoxy), etc., as well as combinations thereof. In various embodiments, $R^1$ and $R^2$ can have the same or a different number of carbon atoms. In various embodiments, the hydrocarbyl group for each of $R^1$ and $R^2$ is an alkyl group that is saturated and optionally straight-chain. Additionally, the alkyl group in such embodiments can be the same for each of $R^1$ and $R^2$ of a polymer chain. Non-limiting examples of alkyl groups suitable for use in $R^1$ and $R^2$ include methyl, ethyl, 1-propyl, 2-propyl, 1-butyl, isobutyl, t-butyl, or combinations of two or more thereof.

Additionally, the siloxane polymer can contain various terminating groups as an $R^1$ and/or $R^2$ group, such as vinyl groups, hydroxyl groups, hydrides, isocyanate groups, epoxy groups, acid groups, halogen atoms, alkoxy groups, acyloxy groups, ketoximate groups, amino groups, amido groups, acid amido groups, amino-oxy groups, mercapto groups, alkenyloxy groups, alkoxyalkoxy groups, or aminoxy groups as well as combinations thereof. Additionally, a polymer composition can include a mixture of two or more siloxane polymers.

In some embodiments, a high molecular weight siloxane polymer can be proved by copolymerizing multiple siloxane polymers having a low weight average molecular weight (e.g., a molecular weight of less than 100,000 grams per mole) with polysiloxane linkers. In one particular embodiment, for instance, the resin may be formed by copolymerizing one or more low molecular siloxane polymer(s) with a linear polydiorganosiloxane linker, such as described in U.S. Pat. No. 6,072,012 to Juen, et al. A substantially linear polydiorganosiloxane linker may have the following general formula:

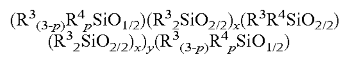

$$(R^3_{(3-p)}R^4_pSiO_{1/2})(R^3_2SiO_{2/2})_x(R^3R^4SiO_{2/2})(R^3_2SiO_{2/2})_x)_y(R^3_{(3-p)}R^4_pSiO_{1/2})$$

wherein,

- each $R^3$ is a monovalent group independently selected from the group consisting of alkyl, aryl, and arylalkyl groups;
- each $R^4$ is a monovalent group independently selected from the group consisting of hydrogen, hydroxyl, alkoxy, oximo, alkyloximo, and aryloximo groups, wherein at least two $R^5$ groups are typically present in each molecule and bonded to different silicon atoms;
- p is 0, 1, 2, or 3;
- x ranges from 0 to 200, and in some embodiments, from 0 to 100; and
- y ranges from 0 to 200, and in some embodiments, from 0 to 100.

In certain embodiments, the siloxane polymer may be provided in the form of a masterbatch that includes a carrier resin. The carrier resin may, for instance, constitute from about 0.05 wt. % to about 15 wt. %, in some embodiments from about 0.1 wt. % to about 10 wt. %, and in some embodiments, from about 0.5 wt. % to about 8 wt. % of the polymer composition. Any of a variety of carrier resins may be employed, such as polyolefins (ethylene polymer, propylene polymers, etc.), polyamides, etc. In one embodiment, for example, the carrier resin is an ethylene polymer. The ethylene polymer may be a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %. The density of the ethylene polymer may vary depending on the type of polymer employed, but generally ranges from about 0.85 to about 0.96 grams per cubic centimeter (g/cm$^3$). Polyethylene "plastomers", for instance, may have a density in the range of from about 0.85 to about 0.91 g/cm$^3$. Likewise, "linear low density polyethylene" (LLDPE) may have a density in the range of from about 0.91 to about 0.940 g/cm$^{3-}$; "low density polyethylene" (LDPE) may have a density in the range of from about 0.910 to about 0.940 g/cm$^3$; and "high density polyethylene" (HDPE) may have density in the range of from about 0.940 to about 0.960 g/cm$^3$, such as determined in accordance with ASTM D792. Some non-limiting examples of high molecular weight siloxane polymer masterbatches that may be employed include, for instance, those available from Dow Corning under the trade designations MB50-001, MB50-002, MB50-313, MB50-314 and MB50-321.

D. Fibrous Filler

A fibrous filler is also employed in a polymer composition. Such fibrous fillers typically constitute from about 10 to about 80 parts, in some embodiments from about 20 to about 75 parts, and in some embodiments, from about 25 to about 60 parts by weight per 100 parts by weight of the polyarylene sulfide(s). For example, fibrous fillers may constitute from about 10 wt. % to about 60 wt. %, in some embodiments from about 15 wt. % to about 50 wt. %, and in some embodiments, from about 20 wt. % to about 45 wt. % of the polymer composition.

Any of a variety of different types of fibers may generally be employed, such as those inorganic fibers that are derived from glass; silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Glass fibers are particularly suitable for use in the present invention, such as those formed from E-glass, A-glass, C-glass, D-glass, AR-glass, R-glass, S1-glass, S2-glass, etc., as well as mixtures thereof. If desired, the glass fibers may be provided with a sizing agent or other coating as is known in the art.

The fibers may have any desired cross-sectional shape, such as circular, flat, etc. In certain embodiments, it may be desirable to employ fibers having a relatively flat cross-sectional dimension in that they have an aspect ratio (i.e., cross-sectional width divided by cross-sectional thickness) of from about 1.5 to about 10, in some embodiments from about 2 to about 8, and in some embodiments, from about 3 to about 5. When such flat fibers are employed in a certain concentration, they may further improve the mechanical properties of the molded part without having a substantial adverse impact on the melt viscosity of the polymer composition. The fibers may, for example, have a nominal width of from about 1 to about 50 micrometers, in some embodiments from about 5 to about 50 micrometers, and in some embodiments, from about 10 to about 35 micrometers. The fibers may also have a nominal thickness of from about 0.5 to about 30 micrometers, in some embodiments from about 1 to about 20 micrometers, and in some embodiments, from about 3 to about 15 micrometers. Further, the fibers may have a narrow size distribution. That is, at least about 60% by volume of the fibers, in some embodiments at least about 70% by volume of the fibers, and in some embodiments, at least about 80% by volume of the fibers may have a width and/or thickness within the ranges noted above. In a molded part, the volume average length of the fibers may be from about 10 to about 500 micrometers, in some embodiments from about 100 to about 400 micrometers, and in some embodiments, from about 150 to about 350 micrometers.

E. Other Components

In addition to the components noted above, the polymer composition may also contain a variety of other optional components to help improve its overall properties. In one embodiment, for instance, an organosilane compound may be employed in the polymer composition, such as in an amount of from about 0.1 to about 8 parts, in some embodiments from about 0.3 to about 5 parts, and in some embodiments, from about 0.5 to about 3 parts by weight per 100 parts by weight of the polyarylene sulfide(s). For example, organosilane compounds can constitute from about 0.01 wt. % to about 3 wt. %, in some embodiments from about 0.02 wt. % to about 2 wt. %, and in some embodiments, from about 0.05 to about 1 wt. % of the polymer composition. The organosilane compound may, for example, be any alkoxysilane as is known in the art, such as vinlyalkoxysilanes, epoxyalkoxysilanes, aminoalkoxysilanes, mercaptoalkoxysilanes, and combinations thereof. In one embodiment, for instance, the organosilane compound may have the following general formula:

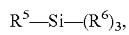

$R^5$—Si—$(R^6)_3$, wherein, $R^5$ is a sulfide group (e.g., —SH), an alkyl sulfide containing from 1 to 10 carbon atoms (e.g., mercaptopropyl, mercaptoethyl, mercaptobutyl, etc.), alkenyl sulfide containing from 2 to 10 carbon atoms, alkynyl sulfide containing from 2 to 10 carbon atoms, amino group (e.g., $NH_2$), aminoalkyl containing from 1 to 10 carbon atoms (e.g., aminomethyl, aminoethyl, aminopropyl, aminobutyl, etc.); aminoalkenyl containing from 2 to 10 carbon atoms, aminoalkynyl containing from 2 to 10 carbon atoms, and so forth;

$R^6$ is an alkoxy group of from 1 to 10 carbon atoms, such as methoxy, ethoxy, propoxy, and so forth.

Some representative examples of organosilane compounds that may be included in the mixture include mercaptopropyl trimethyoxysilane, mercaptopropyl triethoxysilane, aminopropyl triethoxysilane, aminoethyl triethoxysilane, aminopropyl trimethoxysilane, am inoethyl trimethoxysilane, ethylene trimethoxysilane, ethylene triethoxysilane, ethyne trimethoxysilane, ethyne triethoxysilane, am inoethylaminopropyltrimethoxysilane, 3-aminopropyl triethoxysilane, 3-aminopropyl trimethoxysilane, 3-aminopropyl methyl dimethoxysilane or 3-aminopropyl methyl diethoxysilane, N-(2-aminoethyl)-3-aminopropyl trimethoxysilane, N-methyl-3-aminopropyl trimethoxysilane, N-phenyl-3-aminopropyl trimethoxysilane, bis(3-aminopropyl) tetramethoxysilane, bis(3-aminopropyl) tetraethoxy disiloxane, γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane, γ-diallylaminopropyltrimethoxysilane, etc., as well as combinations thereof. Particularly suitable organosilane compounds are 3-aminopropyltriethoxysilane and 3-mercaptopropyltrimethoxysilane.

The polymer composition may also contain a heat stabilizer. By way of example, the heat stabilizer can be a phosphite stabilizer, such as an organic phosphite. For example, suitable phosphite stabilizers include monophosphites and diphosphites, wherein the diphosphite has a molecular configuration that inhibits the absorption of moisture and/or has a relatively high Spiro isomer content. For instance, a diphosphite stabilizer may be selected that has a spiro isomer content of greater than 90%, such as greater than 95%, such as greater than 98%. Specific examples of such diphosphite stabilizers include, for instance, bis(2,4-dicumylphenyl)pentaerythritol diphosphite, bis(2,4-di-t-butylphenyl)pentaerythritol diphosphite, distearyl pentaerythritol diphosphite, mixtures thereof, etc. When employed, heat stabilizers typically constitute from about 0.1 wt. % to about 3 wt. %, and in some embodiments, from about 0.2 wt. % to about 2 wt. % of the composition.

A nucleating agent may also be employed to further enhance the crystallization properties of the composition. One example of such a nucleating agent is an inorganic crystalline compound, such as boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), and so forth. Boron nitride (BN) has been found to be particularly beneficial when employed in the polymer composition of the present invention. Boron nitride exists in a variety of different crystalline forms (e.g., h-BN—hexagonal, c-BN—cubic or spharlerite, and w-BN—wurtzite), any of which can generally be employed in the present invention. The hexagonal crystalline form is particularly suitable due to its stability and softness.

If desired, a crosslinking system may also be employed in combination with any optional impact modifier(s) to help further improve the strength and flexibility of the composition under a variety of different conditions. In such circumstances, a crosslinked product may be formed from a crosslinkable polymer composition that contains the polyarylene sulfide(s), in conjunction with one or more of impact modifier(s), siloxane polymer(s), filler(s) and crosslinking system as well as any other additives. When employed, such a crosslinking system, which may contain one or more crosslinking agents, typically constitutes from about 0.1 to about 15 parts, in some embodiments from about 0.2 to about 10 parts, and in some embodiments, from about 0.5 to about 5 parts per 100 parts of the polyarylene sulfide(s), as well as from about 0.05 wt. % to about 15 wt. %, in some embodiments from about 0.1 wt. % to about 10 wt. %, and in some embodiments, from about 0.2 wt. % to about 5 wt. % of the polymer composition. Through the use of such a crosslinking system, the compatibility and distribution of the polyarylene sulfide and impact modifier can be significantly improved. For example, the impact modifier is capable of being dispersed within the polymer composition in the form of discrete domains of a nano-scale size. For example, the domains may have an average cross-sectional dimension of from about 1 to about 1000 nanometers, in some embodiments from about 5 to about 800 nanometers, in some embodiments from about 10 to about 500 nanometers. The domains may have a variety of different shapes, such as elliptical, spherical, cylindrical, plate-like, tubular, etc. Such improved dispersion can result in either better mechanical properties or allow for equivalent mechanical properties to be achieved at lower amounts of impact modifier.

Any of a variety of different crosslinking agents may generally be employed within the crosslinking system. In one embodiment, for instance, the crosslinking system may include a metal carboxylate. Without intending to be limited by theory, it is believed that the metal atom in the carboxylate can act as a Lewis acid that accepts electrons from the oxygen atom located in a functional group (e.g., epoxy functional group) of the impact modifier. Once it reacts with the carboxylate, the functional group can become activated and can be readily attacked at either carbon atom in the three-membered ring via nucleophilic substitution, thereby resulting in crosslinking between the chains of the impact modifier. The metal carboxylate is typically a metal salt of a fatty acid. The metal cation employed in the salt may vary, but is typically a divalent metal, such as calcium, magnesium, lead, barium, strontium, zinc, iron, cadmium, nickel, copper, tin, etc., as well as mixtures thereof. Zinc is particularly suitable. The fatty acid may generally be any saturated or unsaturated acid having a carbon chain length of from about 8 to 22 carbon atoms, and in some embodiments, from about 10 to about 18 carbon atoms. If desired, the acid may be substituted. Suitable fatty acids may include, for instance, lauric acid, myristic acid, behenic acid, oleic acid, palmitic acid, stearic acid, ricinoleic acid, capric acid, neodecanoic acid, hydrogenated tallow fatty acid, hydroxy stearic acid, the fatty acids of hydrogenated castor oil, erucic acid, coconut oil fatty acid, etc., as well as mixtures thereof. Metal carboxylates typically constitute from about 0.05 wt. % to about 5 wt. %, in some embodiments from about 0.1 wt. % to about 2 wt. %, and in some embodiments, from about 0.2 wt. % to about 1 wt. % of the polymer composition.

The crosslinking system may also employ a crosslinking agent that is "multi-functional" to the extent that it contains at least two reactive, functional groups. Such a multi-functional crosslinking reagent may serve as a weak nucleophile, which can react with activated functional groups on the impact modifier (e.g., epoxy functional groups). The multi-functional nature of such molecules enables them to bridge two functional groups on the impact modifier, effectively serving as a curing agent. The multi-functional crosslinking agents generally include two or more reactively functional terminal moieties linked by a bond or a non-polymeric (non-repeating) linking component. By way of example, the crosslinking agent can include a di-epoxide, poly-functional epoxide, diisocyanate, polyisocyanate, polyhydric alcohol, water-soluble carbodiimide, diamine, diol, diaminoalkane, multi-functional carboxylic acid, diacid halide, etc. Multi-functional carboxylic acids and amines are particularly suitable. Specific examples of multi-functional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized. In certain embodiments, aromatic dicarboxylic acids are particularly suitable, such as isophthalic acid or terephthalic acid.

When employed, multi-functional crosslinking agents typically constitute from about 50 wt. % to about 95 wt. %, in some embodiments from about 60 wt. % to about 90 wt. %, and in some embodiments, from about 70 wt. % to about 85 wt. % of the crosslinking system, while the metal carboxylates typically constitute from about 5 wt. % to about 50 wt. %, in some embodiments from about 10 wt. % to about 40 wt. %, and in some embodiments, from about 15 wt. % to about 30 wt. % of the crosslinking system. For example, the multi-functional crosslinking agents may constitute from about 0.1 wt. % to about 10 wt. %, in some embodiments from about 0.2 wt. % to about 5 wt. %, and in some embodiments, from about 0.5 wt. % to about 3 wt. % of the polymer composition. Of course, in certain embodiments, the composition may be generally free of multi-functional crosslinking agents, or the crosslinking system may be generally free of metal carboxylates.

Still other components that can be included in the composition may include, for instance, particulate fillers (e.g., talc, mica, etc.), antimicrobials, pigments (e.g., black pigments), antioxidants, stabilizers, surfactants, waxes, flow promoters, solid solvents, flame retardants, and other materials added to enhance properties and processability.

II. Melt Processing

The manner in which the polyarylene sulfide and various additives are combined may vary as is known in the art. For instance, the materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the components may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 100° C. to about 500° C., and in some embodiments, from about 150° C. to about 300° C. Likewise, the apparent shear rate during melt processing may range from about 100 $seconds^{-1}$ to about 10,000 $seconds^{-1}$, and in some embodiments, from about 500 $seconds^{-1}$ to about 1,500 $seconds^{-1}$. Of course, other variables, such as the residence time during melt processing, which is inversely proportional to throughput rate, may also be controlled to achieve the desired degree of homogeneity.

If desired, one or more distributive and/or dispersive mixing elements may be employed within the mixing section of the melt processing unit. Suitable distributive mixers may include, for instance, Saxon, DuImage, Cavity Transfer mixers, etc. Likewise, suitable dispersive mixers may include Blister ring, Leroy/Maddock, CRD mixers, etc. As is well known in the art, the mixing may be further increased in aggressiveness by using pins in the barrel that create a folding and reorientation of the polymer melt, such as those used in Buss Kneader extruders, Cavity Transfer mixers, and Vortex Intermeshing Pin mixers. The speed of the screw can also be controlled to improve the characteristics of the composition. For instance, the screw speed can be about 400 rpm or less, in one embodiment, such as between about 200 rpm and about 350 rpm, or between about 225 rpm and about 325 rpm. In one embodiment, the compounding conditions can be balanced so as to provide a polymer composition that exhibits improved properties. For example, the compounding conditions can include a screw design to provide mild, medium, or aggressive screw conditions. For example, system can have a mildly aggressive screw design in which the screw has one single melting section on the downstream half of the screw aimed towards gentle melting and distributive melt homogenization. A medium aggressive screw design can have a stronger melting section upstream from the filler feed barrel focused more on stronger dispersive elements to achieve uniform melting. Additionally, it can have another gentle mixing section downstream to mix the fillers. This section, although weaker, can still add to the shear intensity of the screw to make it stronger overall than the mildly aggressive design. A highly aggressive screw design can have the strongest shear intensity of the three. The main melting section can be composed of a long array of highly dispersive kneading blocks. The downstream mixing section can utilize a mix of distributive and intensive dispersive elements to achieve uniform dispersion of all type of fillers. The shear intensity of the highly aggressive screw design can be significantly higher than the other two designs. In one embodiment, a system can include a medium to aggressive screw design with relatively mild screw speeds (e.g., between about 200 rpm and about 300 rpm).

The crystallization temperature of the resulting polymer composition (prior to being formed into a shaped part) may be about 250° C. or less, in some embodiments from about 100° C. to about 245° C., and in some embodiments, from about 150° C. to about 240° C. The melting temperature of the polymer composition may also range from about 250° C. to about 320° C., and in some embodiments, from about 260° C. to about 300° C. The melting and crystallization temperatures may be determined as is well known in the art using differential scanning calorimetry in accordance with ISO Test No. 11357-3:2018.

III. Formed Component

A variety of different components may be formed using the polymer composition described herein. Moreover, a component may be formed from the polymer composition using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer composition for a desired time period to allow for solidification. The molded product may then be solidified by bringing it to a temperature below that of the melting temperature. The resulting product may be de-molded. The cycle time for each molding process may be adjusted to suit the polymer composition, to achieve sufficient bonding, and to enhance overall process productivity.

IV. Electrical Vehicle

As previously mentioned, the disclosed polymer compositions are particularly beneficial for use in components of an electric vehicle. Referring to FIG. 1, for instance, one embodiment of an electric vehicle 112 that includes a powertrain 110 is shown. The powertrain 110 contains one or more electric machines 114 connected to a transmission 116, which in turn is mechanically connected to a drive shaft 120 and drive wheels 122. Although by no means required, the transmission 116 in this particular embodiment is also connected to an engine 118, though the description herein is equally applicable to a pure electric vehicle. The electric machines 114 may be capable of operating as a motor or a generator to provide propulsion and deceleration capability. The powertrain 110 also includes a propulsion source, such as a battery assembly 124, which stores and provides energy for use by the electric machines 114. The battery assembly 124 typically provides a high voltage current output (e.g., DC current at a voltage of from about 400 volts to about 800 volts) from one or more battery cell arrays that may include one or more battery cells.

The powertrain 110 may also contain at least one power electronics module 126 that is connected to the battery assembly 124 (also commonly referred to as a battery pack) and that may contain a power converter (e.g., converter, etc., as well as combinations thereof). The power electronics module 126 is typically electrically connected to the electric machines 114 and provides the ability to bi-directionally transfer electrical energy between the battery assembly 124 and the electric machines 114. For example, the battery assembly 124 may provide a DC voltage while the electric machines 114 may require a three-phase AC voltage to function. The power electronics module 126 may convert the DC voltage to a three-phase AC voltage as required by the electric machines 114. In a regenerative mode, the power electronics module 126 may convert the three-phase AC voltage from the electric machines 114 acting as generators to the DC voltage required by the battery assembly 124. The battery assembly 124 may also provide energy for other vehicle electrical systems. For example, the powertrain may employ a DC/DC converter module 128 that converts the high voltage DC output from the battery assembly 124 to a low voltage DC supply that is compatible with other vehicle loads, such as compressors and electric heaters. In a typical vehicle, the low-voltage systems are electrically connected to an auxiliary battery 130 (e.g., 12V battery). A battery energy control module (BECM) 133 may also be present that is in communication with the battery assembly 124 that acts as a controller for the battery assembly 124 and may include an electronic monitoring system that manages temperature and charge state of each of the battery cells. The battery assembly 124 may also have a temperature sensor 131, such as a thermistor or other temperature gauge. The temperature sensor 131 may be in communication with the BECM 133 to provide temperature data regarding the battery assembly 124. The temperature sensor 131 may also be located on or near the battery cells within the traction battery 124. It is also contemplated that more than one temperature sensor 131 may be used to monitor temperature of the battery cells.

In certain embodiments, the battery assembly 124 may be recharged by an external power source 136, such as an electrical outlet. The external power source 136 may be electrically connected to electric vehicle supply equipment (EVSE) that regulates and manages the transfer of electrical energy between the power source 36 and the vehicle 112. The EVSE 138 may have a charge connector 140 for plugging into a charge port 134 of the vehicle 112. The charge port 134 may be any type of port configured to transfer power from the EVSE 138 to the vehicle 112 and may be electrically connected to a charger or on-board power conversion module 132. The power conversion module 132 may condition the power supplied from the EVSE 138 to provide the proper voltage and current levels to the battery assembly 124. The power conversion module 132 may interface with the EVSE 138 to coordinate the delivery of power to the vehicle 112.

Figure 2:
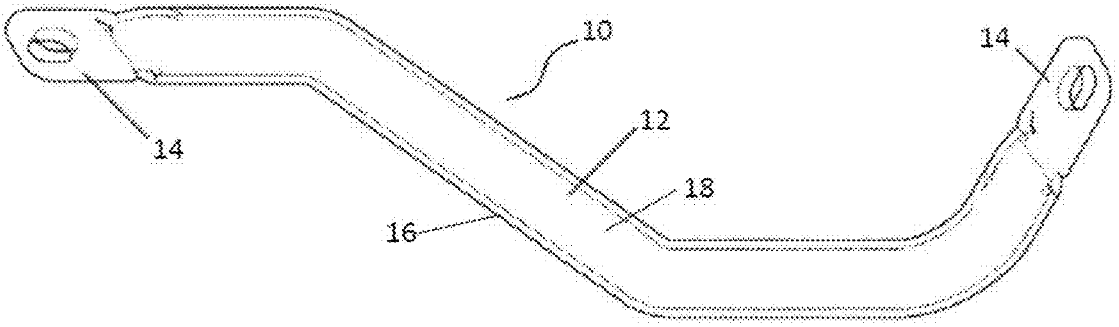
FIG. 2 illustrates one embodiment of a busbar as may incorporate a polymer composition as disclosed herein.

The polymer composition described herein can be included in various components of an electric vehicle as illustrated in FIG. 1. For instance, a busbar, one example of which is illustrated in FIG. 2, may be used to electrically connect individual cells of the battery assembly 124. Referring to FIG. 3, for example, the battery assembly 124 can include a number of battery cells 158. The battery cells 158 may be stacked side-by-side to construct a grouping of battery cells, sometimes referred to as a battery array. In one embodiment, the battery cells 158 are prismatic, lithium-ion cells. However, battery cells having other geometries (cylindrical, pouch, etc.) and/or chemistries (nickel-metal hydride, lead-acid, etc.) could alternatively be utilized within the scope of this disclosure. Each battery cell 158 includes a positive terminal (designated by the symbol (+)) and a negative terminal (designed by the symbol (−)). The battery cells 158 are arranged such that each battery cell 158 terminal is disposed adjacent to a terminal of an adjacent battery cell 158 having an opposite polarity. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic®, or some variation on the 18650 form-factor of 6.5 cm×1.8 cm and approximately 45 g.

The manner in which a busbar connects to individual battery cells of a battery assembly 124, such as shown in FIG. 3, may vary as is known in the art. Referring to FIG. 2, one embodiment of a busbar 10 is shown that includes a conductive body 12. The body 12 includes a conductive material 18, such as copper, aluminum, aluminum alloy, etc., and can generally be in the form of a solid bar, hollow tube, and so forth. The busbar 10 includes a connector portion 14 at either end that is configured to mate with respective terminations of two or more batteries. An insulative portion 16 (e.g., coating or molded material) that includes the polymer composition as described herein may cover a portion of the conductive material of the body 12. To form the busbar 10, the insulative portion 16 can be applied to the surface of the conductive material 18. For instance, a bar or tube of the conductive material 18 can be inserted into a pre-formed tube of the insulating coating 16, e.g., an extruded tube sized and cut to the correct proportions, following which the busbar 10 can be shaped to any suitable form. In another embodiment, the insulating coating can be applied to the surface of the conductive material 18 in the melt, and can solidify on the surface of the conductive material in the applied areas.

Of course, a busbar may be provided in any suitable shape and size. For instance, a busbar may be used as a template for placing the individual battery cells so that they are uniform in each battery assembly manufactured. In such an embodiment, a busbar may hold individual batteries of a battery assembly 124 in place during the manufacturing process and thermal padding or injection-housings, which can be formed of a polymer composition as described herein, can be added without causing the individual battery cells to shift out of position.

Apart from busbars, other components may also employ the polymer composition of the present invention. For instance, FIG. 4 presents a block diagram of battery electronics of an electric vehicle 112. The illustrated battery electronics system includes a battery assembly 124 and a current sensor 142. As shown, current sensor 142 is connected between battery assembly 124 and load/source 144. The current sensor 142 can be configured to measure the current flowing from the battery assembly 124 to the load/source 144 when load/source 144 is a load such as one or more electric machines 114. Likewise, current sensor 142 can be configured to measure the current flowing to battery assembly 124 from load/source 144 when the load/source 144 is a source such as an external power source 136. The (BECM) 133 can be configured to power current sensor 142 to enable its operation. The BECM 133 can further be configured to read an output generated by current sensor 142 which is indicative of the current flowing between battery assembly 124 and load/source 144.

FIG. 5 illustrates one embodiment of a current sensor 142. A current sensor 142 can include a current in port 141 and a current out port 143 as well as standard ground 145, voltage at common collector (VCC) 146, and output port(s) 147. The current sensor 142 can also include a housing 148 that includes the polymer composition as described that can house other components of the current sensor 142, e.g., resistors, capacitors, converters, processing chips, etc.

Figure 6:
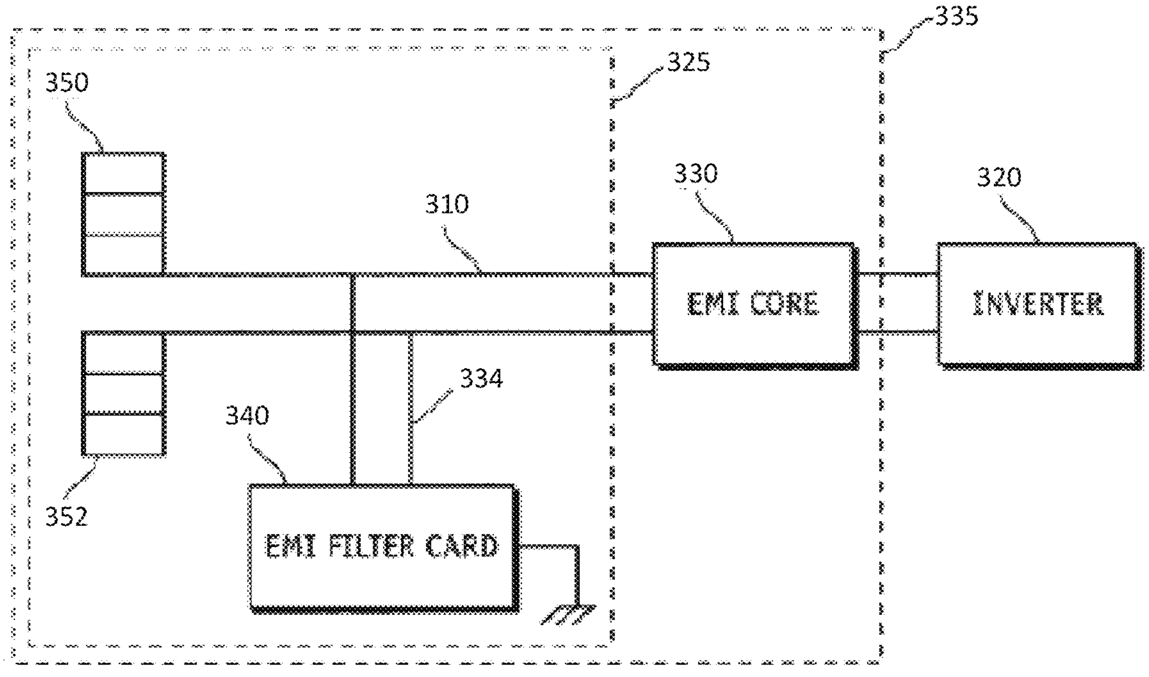
FIG. 6 illustrates an inverter system as may be present in an electric car including components that may incorporate a polymer composition as disclosed herein.

Another component of an electric vehicle as may incorporate the polymer compositions as described is an inverter system, one exemplary embodiment of which is illustrated in FIG. 6. The system includes an inverter module 320 and an interconnection system 335. The interconnection system 335 includes an Electromagnetic Interference (EMI) core 330 and an EMI filter apparatus 325. The inverter module 320 is coupled to the interconnection system 335 by a pair of bus bars 310. The EMI core 330 is located between the EMI filter apparatus 325 and the inverter module 320 and is in communication with the bus bars 310. The EMI filter apparatus 325 includes an EMI filter card 340 and a pair of bolts 350, 352 which include a positive terminal (+) bolt 350 and a negative terminal (−) bolt 352 for coupling to a power source, e.g., the battery assembly 124. The EMI core 330 is coupled to the bolts 350, 352 by the bus bars 310. The EMI filter card 340 is also coupled between ground and the bus bars 310 via a pair of wires 334. An inverter module 320 includes a number of transistors (not shown). Transistors in an inverter module 320 switch on and off relatively rapidly (e.g., 5 to 20 kHz). This switching tends to generate electrical switching noise. The electrical switching noise should ideally be contained inside the inverter module 320 and prevented from entering the rest of the electrical system to prevent interference with other electrical components in the vehicle.

An inverter system can include several components that can incorporate a polymer composition as disclosed including, without limitation, the EMI filter apparatus 325, e.g., as a housing and/or internal support structures, an EMI filter card 340, the bus bars 310, as well as connectors employed within the system. For example, an electrical connector that includes the polymer composition as described herein may be employed in an inverter system as in FIG. 7 or within another portion of an electric vehicle. An electrical connector can in general include a first connector portion that contains at least one electrical contact and an insulating member that surrounds at least a portion of the connector portion. The insulating member may contain the polymer composition of the present invention. The first connector portion may be configured to mate with an opposing second connector portion that contains a receptacle for receiving the electrical contact. In such embodiments, the second connector portion may contain at least one receptacle configured to receive the electrical contact of the first connector portion and an insulating member that surrounds at least a portion of the second connector portion. The insulating member of the second connector portion may also contain the polymer composition of the present invention.

Referring to FIG. 7, FIG. 8, and FIG. 9, one particular embodiment of a connector 200 is shown for use in an electric vehicle, e.g., in an electric vehicle powertrain. The connector 200 contains a first connector portion 202 and a second connector portion 204. The first connector portion 202 may include one or more electrical pins 206 and the second connector portion 204 may include one or more receptacles 208 for receiving the electrical pins 206. A first insulator member 212 may extend from a base 203 of the first connecting portion 202 to surround the pins 206, and similarly, a second insulator member 218 may extend from a base 201 of the second connecting portion 204 to surround the receptacles 208. In certain cases, the periphery of the first insulator member 212 may extend beyond an end of the electrical pins 203 and the periphery of the second insulator member 218 may extend beyond an end of the receptacles 208. The base 203 and/or the first insulator member 212 of the first connector portion 202, as well as the base 201 and/or the second insulator member 218 of the second connector portion 204, may be formed from the polymer composition of the present invention.

Although by no means required, the first connector portion 202 may also include an identification mark 210 secured to or defined by the first protective member 212. The second connecting portion 204 may also optionally define an alignment window 220 sized according to the identification mark 210 to more easily determine when the portions are fully mated. For instance, the identification mark 210 may not be readable unless blockers 221 cover a portion of the identification mark 210. Optionally, the second connecting portion 204 may include a supplemental mark 224 located adjacent to the alignment window 220.

Figure 10:
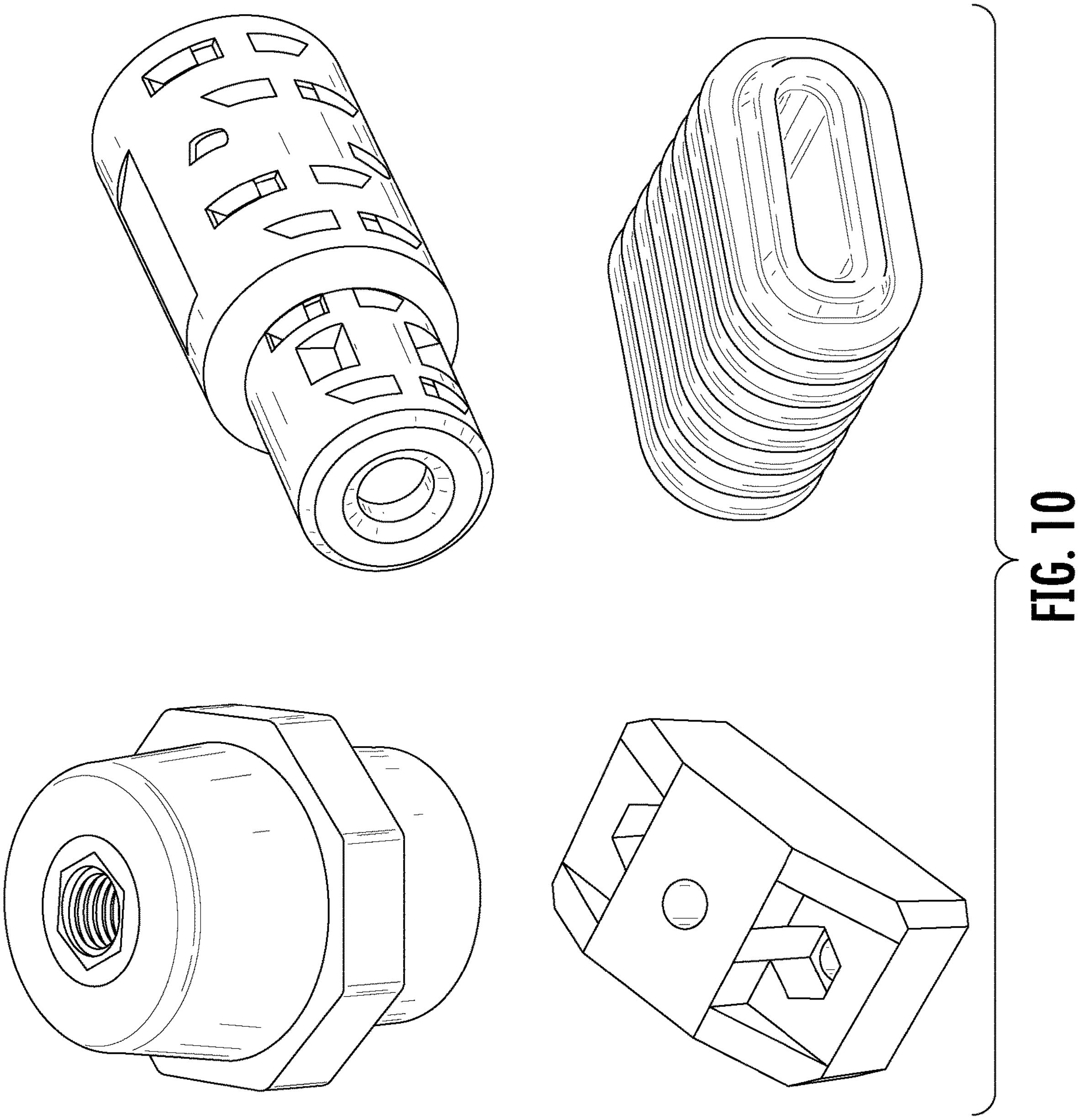
FIG. 10 illustrates examples of components that may incorporate a polymer composition as disclosed herein.
Figure 11:
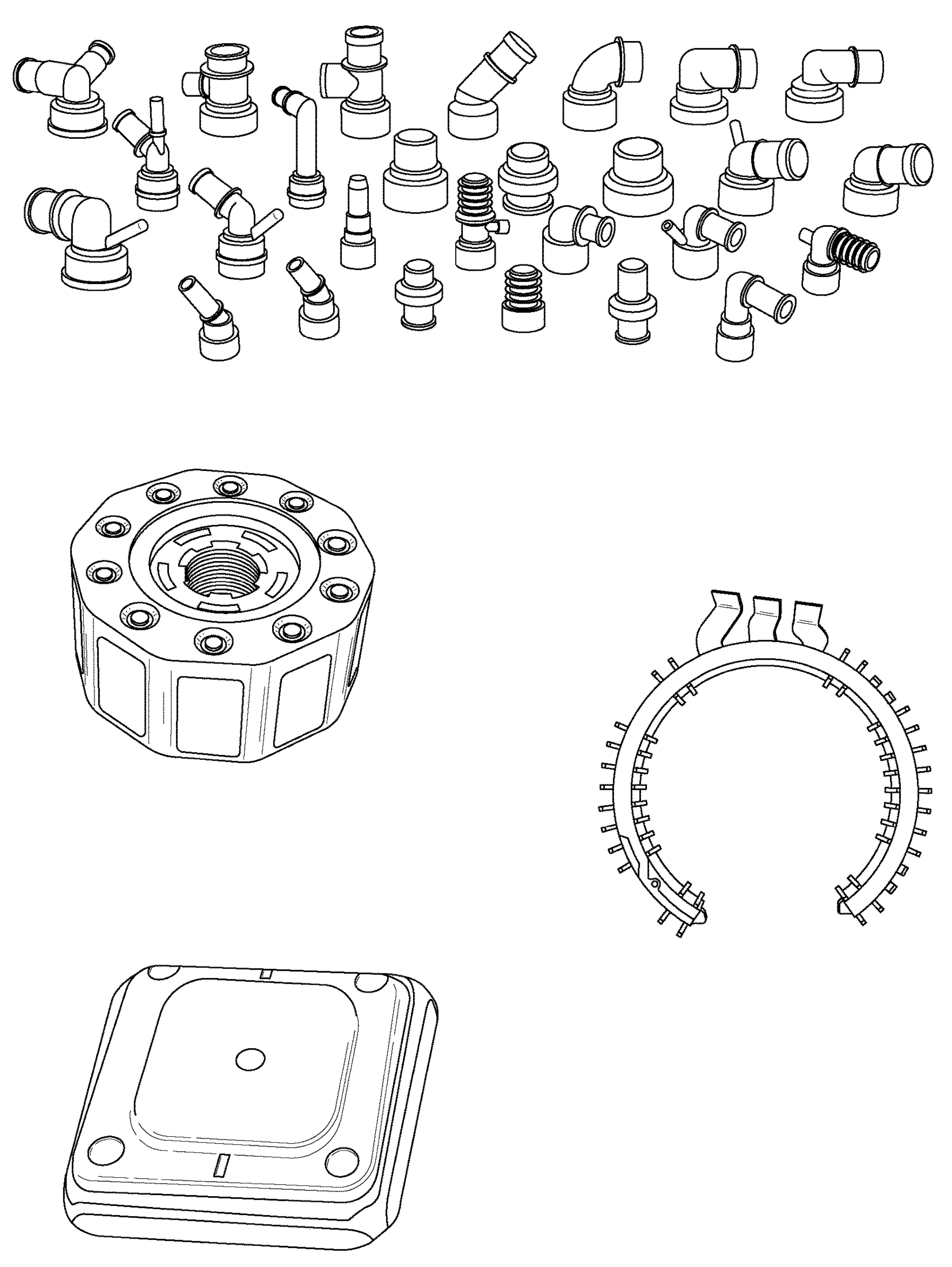
FIG. 11 illustrates additional components that may incorporate a polymer composition as disclosed herein.

FIG. 10 and FIG. 11 illustrate yet other examples of components that may employ the polymer composition of the present invention, such as spacers, connectors, insulators and supports as shown in FIG. 10 and that can be formed from the polymer composition. Components as may incorporate a polymer composition illustrated in FIG. 11 include quick connects, tees, and interconnectors, a plurality of which are illustrated at the top of FIG. 11; brushless direct current motors (middle left of FIG. 11), e.g., sealing rings, housings, supports, etc. of a motor; guide rails (middle right of FIG. 11, also illustrating additional examples of busbars in the image); and battery sealing rings (bottom of FIG. 11).

Systems that can employ the polymer composition of the present invention are in no way limited to only electrical systems. For example, a thermal management system can also beneficially incorporate the polymer composition. A thermal management system of an electric vehicle can generally include multiple different subsystems such as, without limitation, a power train subsystem, a refrigeration subsystem, a battery cooling subsystem, and a heating, ventilation, and cooling (HVAC) subsystem. In some embodiments, one or more subsystems of a thermal management system may in fluid communication with one another, thus allowing hot heat transfer medium to flow from the high temperature circuit into the low temperature circuit, and cooler heat transfer medium to flow from the low temperature circuit into the high temperature circuit.

By way of example, FIG. 12 illustrates a first temperature control loop and FIG. 13 illustrates a second temperature control loop as may be found in electric vehicles, each of which designed for different subsystems and each of which including one or more components that can employ a polymer compositions of the invention. By way of example, a first temperature control loop in a typical electric vehicle (FIG. 12) can include a heat transfer medium (e.g., water) that is pumped through the loop via a suitable pump 160, e.g., an electric water pump, and cooled via heat transfer with a refrigerant in a heat exchanger 162 (e.g., an energy storage system (ESS) heat exchanger) as well as a radiator/reservoir 164. Additionally, the loop can include a heater 166 e.g., a positive temperature coefficient (PTC) heater, which can ensure that the temperature of the system can be maintained within its preferred operating range regardless of the ambient temperature, and the battery assembly 124. A second temperature control loop (FIG. 13) can also include a heat transfer medium that can be the same or differ from the heat transfer medium of another subsystem. The heat transfer medium of the second temperature control loop can be pumped through the loop with a suitable pump 161, a heat exchanger 162, and a radiator reservoir 165. A high temperature control loop can be utilized in cooling the power electronics 167 as well as the electric machines 114 of the vehicle.

One example of a component of a heat management system as may incorporate the polymer composition of the invention is a coolant pump, e.g., an electric water pump, an example of which is illustrated in FIG. 14. As shown, the electric water pump 401 includes an electric motor 410 as a drive source and a hydraulic portion 420 for generating coolant suction and discharge forces. The motor 410 and associated components are retained with in the motor housing 411. The hydraulic portion 420 includes a volute casing 421 that generally includes a spiral flow space, an inlet 422, and outlet 423, and an impeller (not shown) rotated by the electric motor 410. The pump 401 has an interface including a mechanical seal (not shown), for sealing and separating the water flow space and the motor chamber. Generally, a mounting portion 412 is provided on the motor housing 411 to mount the pump 401 in the vehicle. Components of an electric pump 401 such as housings, casings, interfaces, etc. can incorporate a polymer composition of the invention.

The present invention may be better understood with reference to the following examples.

Test Methods

Melt Viscosity: The melt viscosity (Pa-s) may be determined in accordance with ISO 11443:2021 at a shear rate of 400 $s^{-1}$ and using a Dynisco LCR7001 capillary rheometer. The rheometer orifice (die) may have a diameter of 1 mm, length of 20 mm, L/D ratio of 20.1, and an entrance angle of 180°. The diameter of the barrel may be 9.55 mm+0.005 mm and the length of the rod was 233.4 mm. The melt viscosity is typically determined at a temperature of 310° C.

Tensile Modulus, Tensile Stress at Break, and Tensile strain at Break: Tensile properties may be tested according to ISO 527-2/1A:2019 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 5 mm/min for tensile strength and tensile strain at break, and 1 mm/min for tensile modulus.

Izod notched impact strength may be determined according to ISO 180:2019. Specimens were cut from the center of a multi-purpose bar using a single tooth milling machine. Testing temperature was 23° C.

Notched Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C. or −30° C.

Examples 1-2

Examples 1-2 were melt mixed using a 32 mm Coperion co-rotating, fully-intermeshing, twin-screw extruder and include various concentrations of a polyarylene sulfide, impact modifier, glass fibers, siloxane polymer, organosilane, and a colorant. The impact modifier was a random copolymer of ethylene and glycidyl methacrylate having 8 wt. % glycidyl methacrylate content and a melt flow index of 5 g/10 min at 190° C. The siloxane polymer was an UHMW functionalized siloxane polymer provided as a masterbatch at 50% siloxane content and 50% resin content. The organosilane was 3-aminopropyltriethoxysilane. The formulations of each Example are set forth in more detail in the table below.

| | Example 1 | | Example 2 | |
|---|---|---|---|---|
| | Wt. % | Parts by weight | Wt. % | Parts by weight |
| PPS | 63.2 | 100 | 54.5 | 100 |
| Glass Fiber | 30 | 47 | 40 | 74 |
| Impact Modifier | 5 | 8 | 4 | 7 |
| Siloxane Polymer | 1 | 1.6 | 0.8 | 1.5 |
| Organosilane | 0.4 | 0.63 | 0.2 | 0.4 |
| Colorant | 0.4 | 0.63 | 0.5 | 0.9 |

Following formation, the sample was tested for a variety of physical characteristics. The results are set forth below

| | Example 1 | Example 2 |
|---|---|---|
| Melt Viscosity (kpoise) at 400 $s^{-1}$ | 3.7 | 3.5 |
| Tensile Modulus (MPa) | 10,850 | 14,155 |
| Tensile Break Stress (MPa) | 159.5 | 176.9 |
| Tensile Break Strain (%) | 2.2 | 2.0 |
| Izod Notched Impact Strength (kJ/$m^2$) at 23° C. | 12.3 | 12.7 |

Example 1 was re-formulated (Example 1a) and tested again for various physical properties before and after heat aging in air at 240° C. for 1,000 hrs.

| | Example 1a (before heat aging) | Example 1a (after heat aging) |
|---|---|---|
| Tensile Modulus (MPa) | 10,242 | 11,335 |
| Tensile Break Stress (MPa) | 152.16 | 115.91 |
| Tensile Break Strain (%) | 2.0 | 1.2 |
| Charpy Notched Impact Strength (kJ/$m^2$) at 23° C. | 12.0 | 7.8 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising:

from 50 wt. % to 90 wt. % of at least one polyarylene sulfide;

from 25 to 80 parts by weight of a fibrous filler per 100 parts by weight of the polyarylene sulfide, wherein the fibrous filler includes glass fibers;

from 1 to 20 parts by weight of at least one impact modifier per 100 parts by weight of the polyarylene sulfide; and from 0.1 to 10 parts by weight of an ultrahigh molecular weight siloxane polymer per 100 parts by weight of the polyarylene sulfide, the siloxane polymer having a weight average molecular weight of about 100,000 grams per mole or more, wherein the polymer composition exhibits a melt viscosity of 5 kP or less as determined in accordance with ISO 1143:2021 at a temperature of 310° C. and shear rate of 400 $s^{-1}$, and a tensile stress at break of from 120 to 200 MPa as determined at a temperature of 23° C. in accordance with ISO 527:2019.

2. The polymer composition of claim 1, wherein the siloxane polymer is functionalized.

3. The polymer composition of claim 2, wherein the siloxane polymer includes one or more of vinyl groups, hydroxyl groups, hydrides, isocyanate groups, epoxy groups, acid groups, halogen atoms, alkoxy groups, acyloxy groups, ketoximate groups, amino groups, amido groups, acid amido groups, amino-oxy groups, mercapto groups, alkenyloxy groups, alkoxyalkoxy groups, or aminoxy groups.

4. The polymer composition of claim 1, further comprising from about 0.1 to about 8 parts by weight of an organosilane compound.

5. The polymer composition of claim 4, wherein the organosilane compound includes an aminoalkoxysilane.

6. The polymer composition of claim 1, wherein the impact modifier includes an epoxy-functionalized monomeric unit.

7. The polymer composition of claim 6, wherein the epoxy-functionalized monomeric unit contains an epoxy-functionalized (meth)acrylic monomeric component.

8. The polymer composition of claim 7, wherein the epoxy-functionalized (meth)acrylic monomeric component is formed from glycidyl acrylate, glycidyl methacrylate, or a combination thereof.

9. The polymer composition of claim 6, wherein the impact modifier further includes an α-olefin monomeric component.

10. The polymer composition of claim 9, wherein the α-olefin monomeric component constitutes from about 55 wt. % to about 95 wt. % of the impact modifier, and the epoxy-functional (meth)acrylic monomeric component constitutes from about 1 wt. % to about 20 wt. % of the impact modifier.

11. The polymer composition of claim 10, wherein the impact modifier further includes a non-epoxy functional (meth)acrylic monomeric component in an amount of from about 5 wt. % to about 35 wt. % of the polymer.

12. The polymer composition of claim 1, wherein the impact modifier has a melt flow index of from about 1 to about 30 grams per 10 minutes, as determined in accordance with ASTM D1238-13 at a load of 2.16 kg and temperature of 190° C.

13. The polymer composition of claim 1, wherein the polyarylene sulfide is a polyphenylene sulfide.

14. The polymer composition of claim 13, wherein the polyarylene sulfide is a linear polyphenylene sulfide.

15. The polymer composition of claim 1, wherein the polymer composition exhibits an Izod notched impact strength of about 5 $kJ/m^2$ or more as determined at a temperature of 23° C. in accordance with ISO 180:2019.

16. An electric vehicle comprising a powertrain that includes at least one electric propulsion source and a transmission that is connected to the propulsion source via at least one power electronics module, wherein the electric vehicle comprises the polymer composition of claim 1.

17. The electric vehicle of claim 16, wherein the electric vehicle comprises an electrical component comprising the polymer composition.

18. The electric vehicle of claim 17, wherein the electrical component comprises a busbar, current sensor, inverter filter, electrical connector, a brushless direct current motor, a guide ring, a battery cell sealing ring, or a combination thereof.

19. The electric vehicle of claim 16, wherein the electrical component comprises a quick connector, a tee, an interconnector, or a combination thereof.

20. The electric vehicle of claim 16, wherein the electric vehicle comprises a thermal management system component comprising the polymer composition.

21. The electric vehicle of claim 20, wherein the thermal management system component comprises a coolant pump.

* * * * *